United States Patent [19]

Johns

[11] 4,093,054
[45] June 6, 1978

[54] BELLEVILLE DAMPER FOR TORQUE TRANSMITTING COUPLING DEVICE

[75] Inventor: Marvin D. Johns, Fort Wayne, Ind.

[73] Assignee: Dana Corporation, Toledo, Ohio

[21] Appl. No.: 781,813

[22] Filed: Mar. 28, 1977

[51] Int. Cl.² .............................................. F16D 3/14
[52] U.S. Cl. .............................. 192/106.1; 192/106.2; 64/27 F
[58] Field of Search ............... 192/106.1, 106.2, 70.17; 64/27 F

[56] References Cited

U.S. PATENT DOCUMENTS

| | | | |
|---|---|---|---|
| 2,674,863 | 4/1954 | Thelander | 192/106.2 X |
| 3,428,155 | 2/1969 | Binder et al. | 192/106.1 |
| 3,556,273 | 1/1971 | Maucher | 192/106.2 |
| 3,802,541 | 4/1974 | Schneider | 192/106.1 |

Primary Examiner—Edgar W. Geoghegan
Attorney, Agent, or Firm—Robert M. Leonardi

[57] ABSTRACT

An improved resilient means is provided between cooperating rotary elements of a coupling device to increase the torque capacity of the unit. The resilient means consists of a Belleville stack located in aligned pockets provided in the rotary elements of the coupling device. The operational stability of the Belleville stack is increased by providing suitable guide means which also function as means for making the Belleville stack a self-contained easily replaceable assembly.

12 Claims, 11 Drawing Figures

BELLEVILLE DAMPER FOR TORQUE TRANSMITTING COUPLING DEVICE

BACKGROUND OF THE INVENTION

This invention relates to coupling devices and more particularly to resilient means for establishing a drive connection between cooperating rotary elements of such a device.

Coupling devices of the present type are widely used in heavy duty engine applications and require some form of resilient means to absorb or prevent transmission of shocks and vibrations while serving as a means to establish a driving connection between the elements of the coupling device.

With the increase in capacity of the newer and larger diesel engines, torque loads are becoming so great that known types of resilient means have not operated satisfactorily to absorb the torsional loads and resonance present in these engines.

Attempts have been made to remedy this problem by redesigning the elements of the coupling device to accommodate additional sets of resilient means so that they are capable of acting in series. In addition, various spring configurations have also been tried in the past, but for one reason or another have proved unsatisfactory.

SUMMARY OF THE PRESENT INVENTION

The present invention overcomes the drawbacks of the conventional designs through the use of Belleville stacks. The Belleville stacks include a plurality of guided dished washers suitably positioned between the rotatable elements of a coupling device. The design lends itself to one that can be conveniently and readily adapted to replace any form of resilient means presently in use in related types of coupling devices.

Due to the inherent characteristics of the dished washers, i. e., the symmetrical design, the dished washer gives uniform load distribution over 360°. In turn, stacking of the dished washers means that the combined pressures between the succeeding washers will be exactly the same at all points. As a result of the uniform pressure the dished washers will wear evenly resulting in longer life. Further, the load defection curve of these dished washers can be adjusted to produce given amounts of friction between adjacent washers as they are deflected. In addition, the resistance to defection may be increased or decreased by controlling the thickness or arranging the dished washers in series, series-parallel or straight parallel. The life of the unit is extended by providing guide means for the dished washers in the form of internally located rods or externally mounted telescoping sleeves.

Accordingly, it is an object of this invention to provide an improved resilient connection for a coupling device consisting of a Belleville stack that can be easily tailored to meet widely differing engine load requirements to enable torque capabilities to be controlled beyond that presently possible.

Other objects and advantages of the invention will become more apparent from a reading of the following description when taken in conjunction with the accompanying drawings.

BRIEF DESCRIPTION OF THE DRAWINGS

In the drawings

FIG. 4 is an enlarged cross-sectional view of the resilient means and associate parts taken along line 4—4 of FIG. 3;

FIG. 5 is a perspective view of the guide means illustrated in FIGS. 1-4;

DESCRIPTION OF THE PREFERRED EMBODIMENTS

Figure 1:
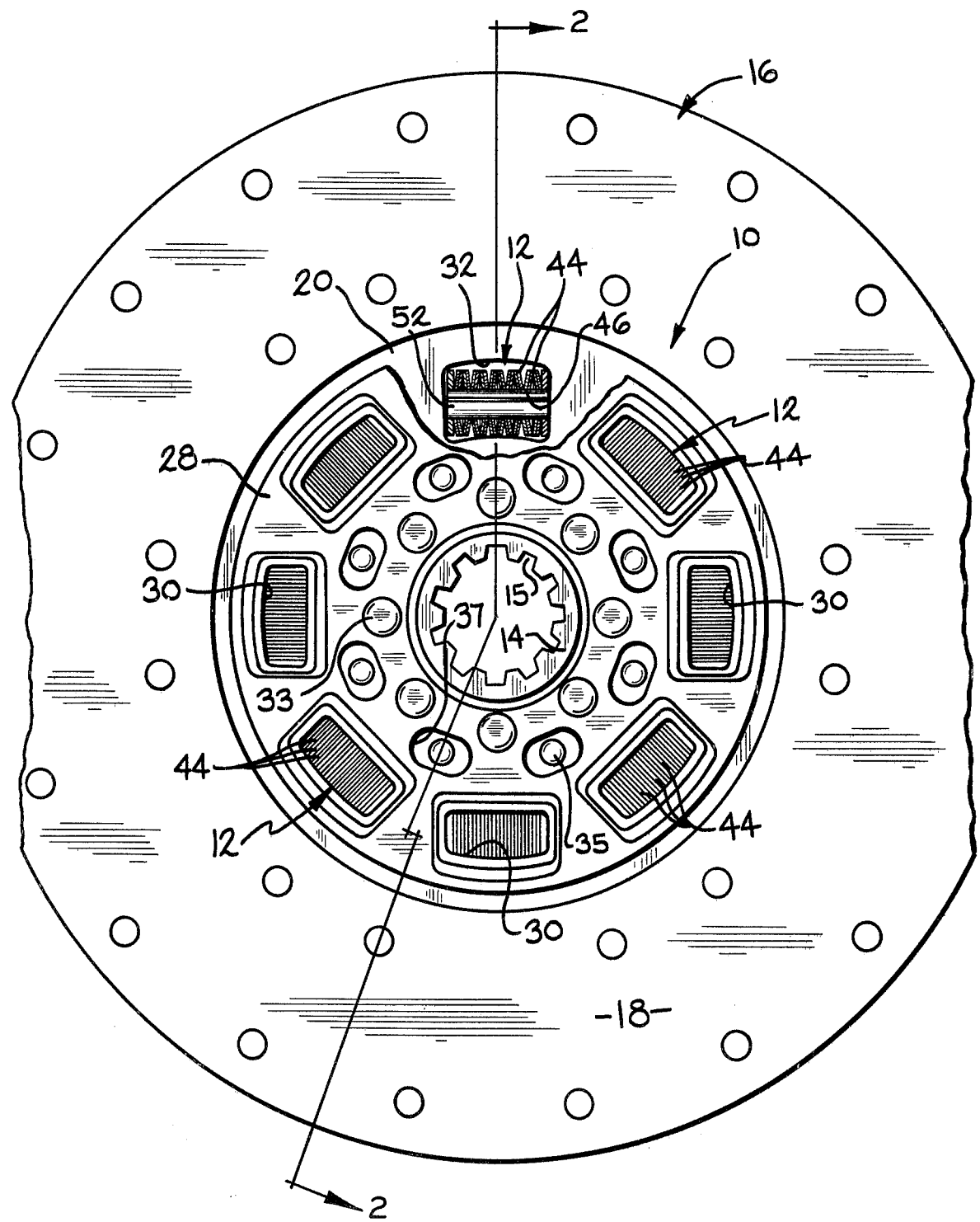
FIG. 1 is a partially broken away end elevational view of a clutch driven disc embodying resilient means constructed in accordance with the teachings of the invention.

In a preferred embodiment the coupling device of the present invention is shown associated with a clutch driven disc assembly. In another embodiment the same coupling device is disclosed in connection with a pair of axially aligned shafts.

Referring now to the drawings and specifically to the preferred embodiment disclosed in FIGS. 1-4, a coupling device is shown generally at 10 having improved resilient means in the form of a plurality of circumferentially arranged Belleville stacks 12. The Belleville stacks 12 serve to establish a drive and dampening connection between rotary elements of the coupling device which include an internally located hub 14 and an outer friction disc 16. The coupling device 10, the hub 14 and friction disc 16 constituting a clutch driven disc assembly of the type used to deliver torque between a vehicle engine and transmission (not shown).

The hub 14 has an internally splined bore 15 adapted to mate with the outer end of a transmission input shaft (not shown) in a well known manner. Friction disc 16 is provided with conventional friction facings 18 secured to opposite sides of an annular support plate 20. The friction facings 18 are adapted to be clamped between the driving members of an engine driven clutch assembly (not shown) in a manner familiar to those skilled in the art.

Figure 2:
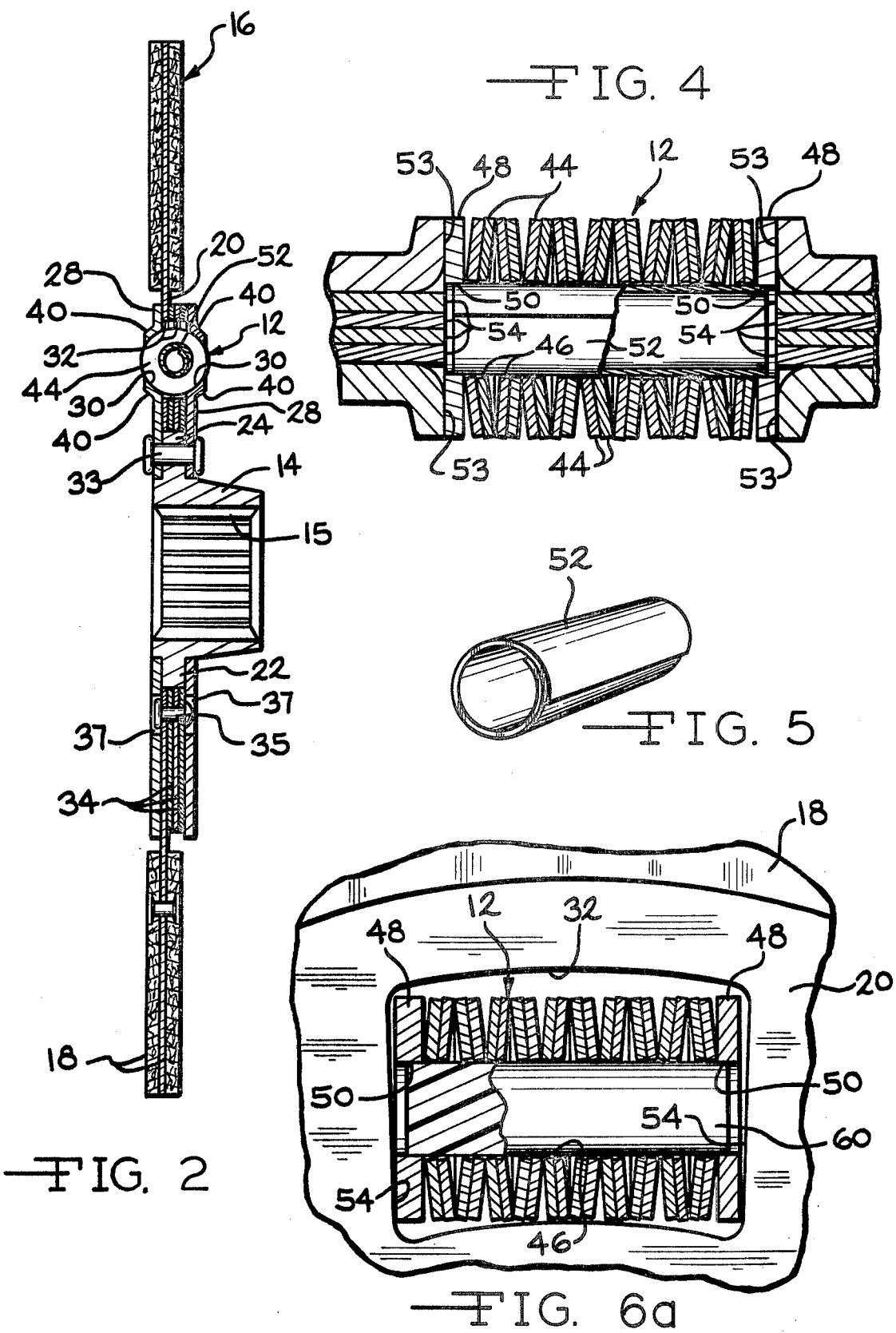
FIG. 2 is a cross-sectional view of the clutch driven disc taken along line 2—2 of FIG. 1.
Figure 3:
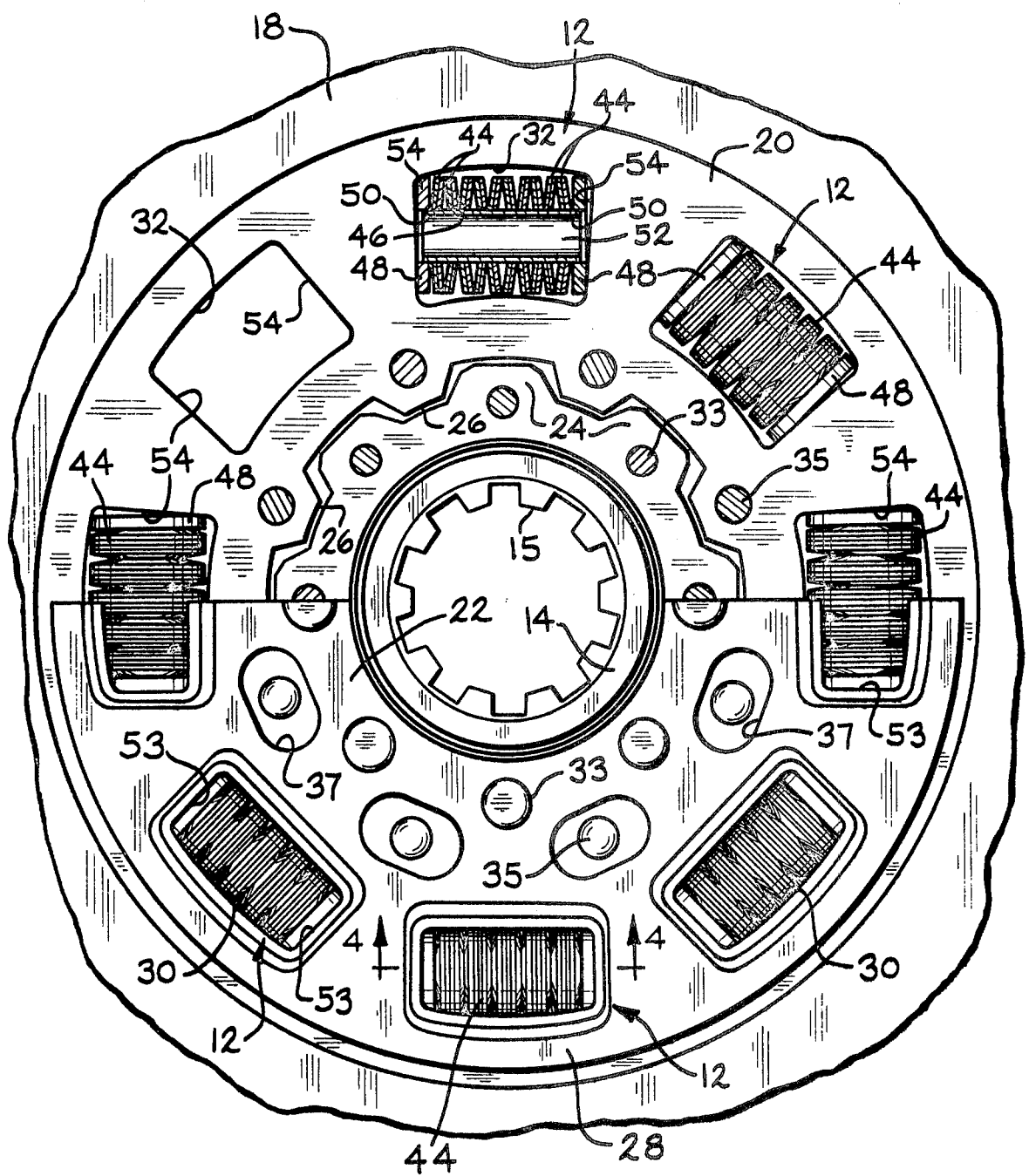
FIG. 3 is an enlarged end elevational view similar to FIG. 1 with portions broken away and parts removed to more clearly see the operating relationship between the elements of the clutch disc.

As best seen in FIGS. 2 and 3, to establish a positive drive connection between the hub 14 and outer friction disc 16, the hub 14 is constructed with an integral radially extending annular flange 22 having a plurality of equally spaced outwardly directed teeth 24. These teeth 24 are disposed and normally maintained in a position midway between a plurality of cooperating inwardly directed teeth 26 formed on the interior of the support plate 20. The teeth 24 and 26 are designed to permit limited relative rotation between the hub 14 and support plate 20 against the resistance of the Belleville stack 12. The limited relative rotations results in a lost motion connection which serves to allow the Belleville stacks 12 to initially absorb or prevent the transmission of shock loads and torsional vibrations while permitting subsequent positive drive to be transmitted between the hub 14 and disc 16 by engagement of the teeth 24 and 26.

To locate the Belleville stacks 12 so they are able to function in their intended manner, a pair of spaced annular cover members 28 are provided on the hub 14 so as to lie in overlapping relation with the inner portion of the support plate 20. Aligned pockets 30 and 32 are provided in the cover members 28 and support plate 20 respectively for receiving the Belleville stacks 12. More specifically, the cover members 28 are spaced on opposite sides of the radial flange 22 of hub 14 with their inner portions secured to the flange 22 by a plurality of circumferentially arranged rivets 33.

The support plate 20 of driven disc 16 is located between the cover members 28 and a plurality of reinforcing elements 34, three being shown, are secured to one side of plate 20 by a series of rivets 35. The support plate 20 and reinforcing elements 34 substantially fill the axial space provided between the cover members 28. The reinforcing elements 34 are annular in configuration and approximately equal in diameter to that of the cover members 28. The interior of the reinforcing elements 34 are constructed with inwardly directed teeth 26 identical to those provided on the interior of the support plate 20.

From the description thus far, it will be apparent that the hub 14 and cover members 28 are rigidly secured together by rivets 33 and constitute a rotatable hub assembly. Similarly, support plate 20 of driven disc 16 and reinforcing elements 34 are rigidly secured together by rivets 35 and constitute a rotatable driven disc assembly.

To accommodate the previously mentioned limited relative rotation that occurs between the hub 14 and driven disc 16 as a result of the lost motion connection, cover members 28 are provided with circumferentially elongated openings 37 into which the opposed head portions of rivets 35 project. The openings 37 are of such a size as to permit the necessary clearance for the rivet head portions as the Belleville stacks 12 are compressed when establishing a driving connection or while functioning as a means to absorb or prevent transmission of shocks and vibrations between the rotatable elements of the coupling device.

Referring to FIGS. 1-3, the axially aligned pockets 30-32 formed in cover members 28 and the support plate 20 and reinforcing elements 34 respectively are circumferentially disposed and spaced in a symmetrical manner about the periphery of flange 22 on the hub 14. The pockets 30 in the cover members 28 and 32 in the support plate 20 and reinforcing elements 34, as best seen in FIG. 3, consist of substantially identical openings suitably shaped to accommodate the Belleville stack 12. As seen in FIG. 2, the Belleville stacks 12 are retained in the aligned pockets 30 and 32 by short arcuate inwardly directed lips 40 constructed on the outside portions of the cover member pockets 30. The arcuate configuration of the lips 40 extend toward each other to closely conform to the peripheral portion of the Belleville stack 12 thereby serving as means to operatively retain the Belleville stack 12 within the aligned pockets 30-32.

Each Belleville stack 12 consists of a plurality of annular dished washers 44, a pair of annular thrust plates 48 and guide means to retain the same in assembled relation within the pockets 30 and 32. The dished washers 44 have central openings 46 adapted to substantially align with central openings 50 in the thrust plates 48. In the preferred embodiment, the guide means takes the form of an elongated compressable spring pin 52. With reference to FIG. 5, it will be seen that the pin 52 comprises a piece of resilient sheet metal rolled up into the form of a tubular rod of cylindrical cross-section with the ends overlapping so as to allow for radial contraction and expansion of the rod.

To achieve the desired function, the spring pin 52, as illustrated in FIG. 4, passes through the openings 46 in the dished washers 44 with the outer ends terminating and adapted to frictionally engaging within the openings 50 in the thrust plates 48. The unloaded diameter of the spring pin 52 is slightly greater than the internal diameter of the thrust plate openings 50 so that the end portions of the spring pin 52 produce a predetermined load within the openings 50 sufficient to hold associate thrust plates 48 and supported dished washers 44 in concentric operative relation.

As indicated, the Belleville stacks 12 serve to establish a drive and dampening connection between the hub 14 and friction disc 16. For this purpose, the pockets 30 in cover members 28 and 32 in support plate 20 and reinforcing elements 34 are provided with opposed thrust receiving side walls 53 in pockets 30 and opposed thrust receiving walls 54 in pockets 32. In the normally inactive position, i. e., with the hub 14 and friction disc 16 not transmitting torque, the pockets 30 and 32 are aligned and the dished washers 44 are under some compression, and the opposed thrust plates 48 bear against the thrust walls 53 and 54. In the present invention, referring to FIG. 4, when driving force is transmitted from the hub 14 to the friction disc 16, or vice versa, the side walls 53 in the cover member pockets 30 apply a force on the end of the Belleville stack 12 by means of their engagement with the thrust plate 48. Continued application of force causes the dished washers 44 to assume a compressed condition. This results in the thrust plate 48 being moved away from the adjacent walls 54 of the pockets 32. If the driving force is from the friction disc 16 to the hub 14, the thrust plate 48 is picked up by the side wall 54 of the pockets 32 and moved away from the adjacent wall 53 of the pockets 30. The reverse of this operation takes place at the opposite end of the Belleville stack 12. Because of the function of thrust plates 48, they are sufficiently hardened to provide a hard wear surface that will withstand the loads being exerted on them.

With specific reference to the Belleville stack 12 shown in FIGS. 1-4, it will be seen that the dished washers 44 are uniform in shape and arranged in series-parallel with the groups consisting of individual or multiple opposed nested pairs. The concave sides of the alternate groups face in opposite directions and thereby produce a double convex space between each group to provide clearance for the resilient movement of the dished washers.

Figure 6B:
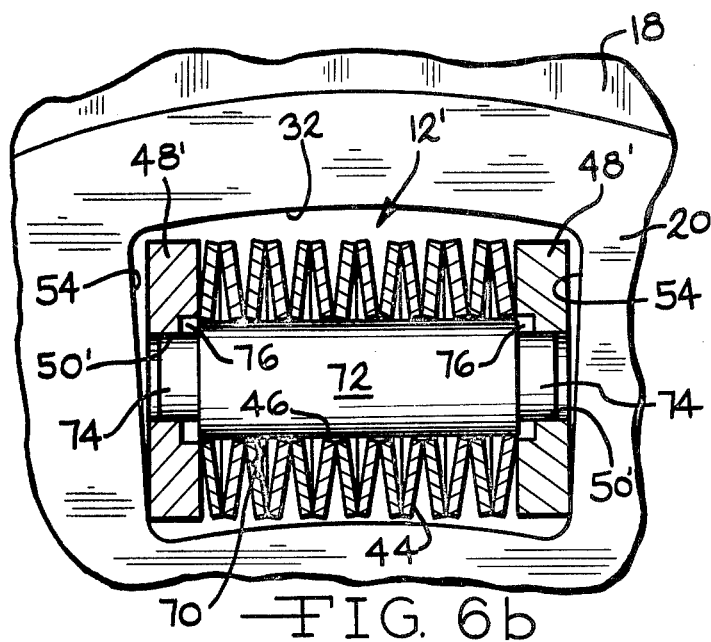
FIG. 6 a, b, and c are views similar to FIG. 3 showing alternate embodiments.

An alternate guide means is disclosed in FIG. 6a which consists of a cylindrical rod made of a non-metalic material. The rod 52 has an outer diameter which passes through the openings 46 in the dished washers 44 and closely conforms to the internal diameter of the openings 50 in the thrust plates 48. By closely piloting the thrust plates 48 on the rod 52, the elements are retained in concentric relation.

In a coupling device of the type described, the rate of deflection can be easily modified to fit numerous requirements. For example, the rate can be decreased by providing a Belleville stack 12 such as that shown in FIG. 6b. The number of dished washers 44 in this application are reduced and stacked in series. To fill the normal space provided in the pockets 30 and 32 of a conventional assembly merely requires the addition or modification of the plates. In this embodiment a slightly modified guide means is shown. The guide means here consists of cylindrical stepped rod 70 provided with an enlarged diameter intermediate portion 72 and reduced diameter end portions 74. The intermediate portion 72 is adapted to pass through central openings 46 of the dished washers 44 while the end portions 74 frictionally engage reduced diameter openings 50a in modified thrust plates 48'. To accommodate movement of the intermediate portion 72 of the guide rod 70 when the dished washers 44 are compressed, the inner face of each thrust plate 48' is provided with a counter bore 76 equal to the diameter of the intermediate portion 72. Thus, under compressive load, the intermediate portion 72 is capable of movement into the counter bore 76 without affecting the operation of the Belleville stack 12.

Figure 6C:
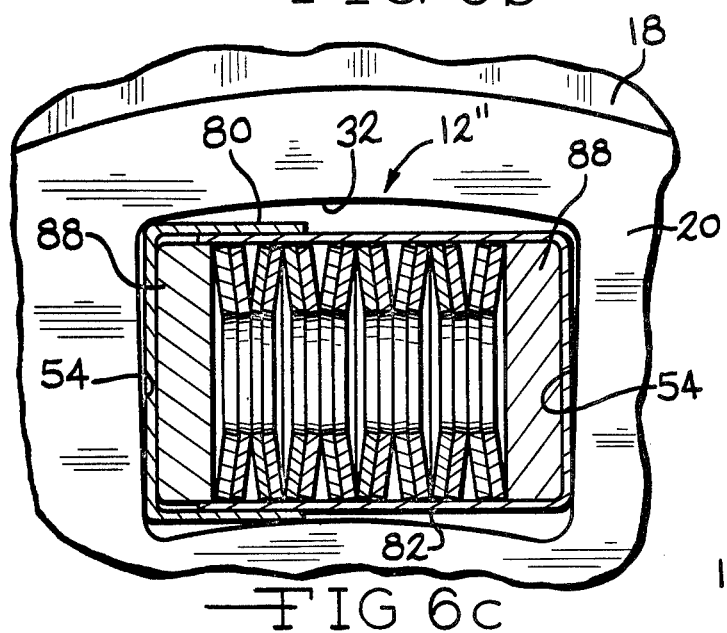

Another modified form of the invention is disclosed in FIG. 6c which shows an external guide means for a Belleville stack in which the dished washers are arranged in parallel series to increase the load. The guide means consists of a pair of opposed telescoping cylindrical housings 80 and 82. Because of their function, it is necessary to harden at least the ends of the housings 80 and 82 which abut the side walls 53-54 of pockets 30 and 32. In this particular embodiment, thrust plates 88 are positioned at each end of the Belleville stack 12" and are of such a diameter as to permit the one thrust plate 88 to slide within the bore of the inner housing 82 when a compressive load is applied to the Belleville stack 12".

Figure 7:
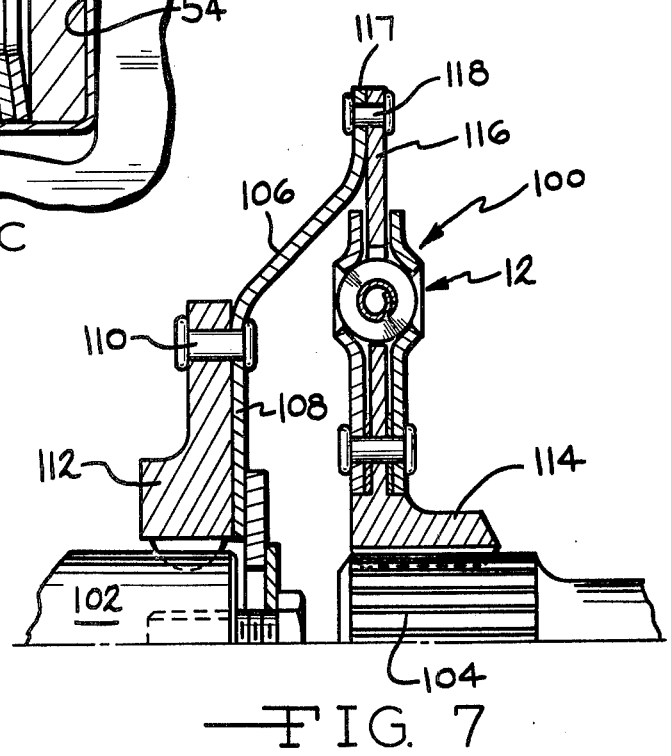
FIG. 7 is a cross-sectional view of the upper portion of another form of coupling device embodying the resilient means shown in FIGS. 1-5.

An alternate embodiment of the invention is illustrated in FIG. 7 in which a slightly modified rotary coupling device 100 is shown interposed between an engine driven crankshaft 102 and a transmission input shaft 104. The coupling device 100 has an internal hub 114 splined to the transmission input shaft 104 and an outer annular disc 116 drivingly connected to the crankshaft 102 by means of a drive plate 106. The drive plate 106 has a radially extending inner mounting flange 108 adapted to be secured by rivets 110 to a connecting member 112 which is keyed to the crankshaft 102. A radially extending outer mounting flange 117 is also provided on the drive plate 106 and is connected to the peripheral portion of the disc 116 by rivets 118. Thus, rotary drive is transmitted from the crankshaft 102 through drive plate 106 to the coupling device 100 and out of the transmission input shaft 104.

In this embodiment the annular disc 116 replaces the friction disc 16 illustrated in the preferred embodiment. With the exception of this, the remaining portions are identical and accordingly need not be described in further detail.

Figure 8:
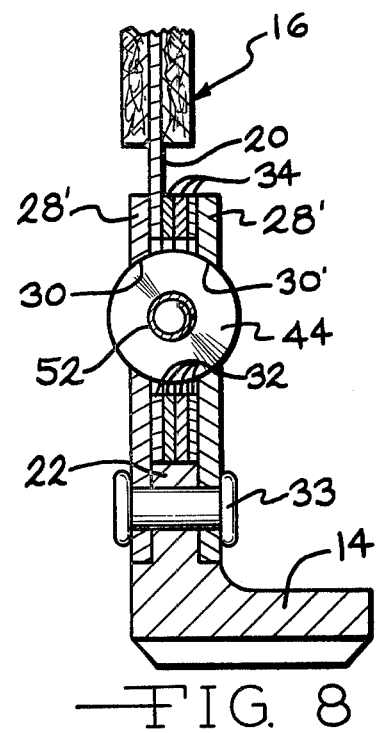
FIG. 8 is a partial enlarged view similar to FIG. 2 showing a modified cover member.

Further modifications can be made to the cover members 28'. For example, the retaining lips 40 can be eliminated and the Belleville stacks 12 may be retained in the cover member pockets 30' in the manner illustrated in FIG. 8. Here the Belleville stacks 44 are held within the pockets 30 by means of the angular disposed surfaces 30'. The height of the pockets is somewhat less than the diameter of the dished washers 44 and thrust plates 48 so that these surfaces will prevent the same from dislodging.

Figure 9:
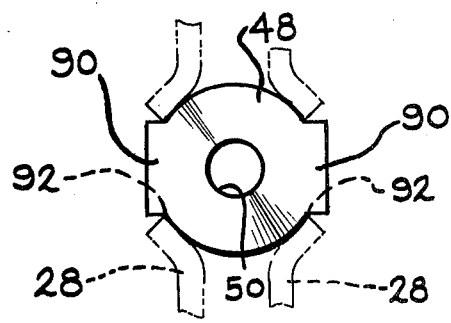
FIG. 9 is an enlarged end view of an alternate thrust plate.

The number of dished washers and/or thrust plates can be altered to accommodate various load requirements. Also, in certain applications, it may be advisable to provide some means to prevent the Belleville stacks 12 from rotating within the pockets 30 due to excessive vibrations. One method of accomplishing this is disclosed in FIG. 9 wherein outwardly directed arms 90 are integrally constructed on each thrust plate 48. The cover members 28 are provided with similarly notched portions 92 into which these arms project so that relative movement is prevented.

As is well known, changes in diameter of the dished washers occurring under load are compensated for by providing sufficient clearance between the external guide surfaces in the pockets and the periphery of the dished washers.

From the foregoing, it will be seen that the dished washers can be stacked in series, in parallel or in parallel-series to obtain the desired resistance and amplitude to fit a variety of applications.

The effects of stacking identical dished washers in series results in deflection increasing in direct proportion to the number of washers used with the load remaining the same as with a single washer. With identical dished washers stacked in parallel, the effect is that the load increases in proportion to the number of washers employed. A combination of increased load and increased deflection is achieved by stacking the washers in a series-parallel arrangement.

As mentioned, dished washers arranged in stacks require a guide means to prevent lateral slipping under load. Guide means may be located inside the Belleville stack as shown in FIGS. 1–6b or outside as disclosed in the alternate embodiment illustrated in FIG. 6c.

Having thus described the preferred embodiments of the present invention, it should be understood that the invention is not to be limited to the specific construction and arrangements shown and described. It will become apparent to those skilled in the art that changes may be made without departing from the principles of the invention as defined by the appended claims.

What I claim is:

1. In a coupling device, a rotatable hub assembly, a rotatable disc assembly rotatable relative to said hub assembly, aligned pockets in said hub and disc assembly having spaced side walls, resilient means in said aligned pockets adapted to establish a yieldable drive connection between said hub and disc assembly, said resilient means comprising, a Belleville stack having end portions engaging said side walls in said aligned pockets, and guide means engaging said Belleville stack to retain the same in assembled relation within said aligned pockets.

2. A coupling device according to claim 1 wherein a thrust plate is disposed between said end portions of said Belleville stack and said spaced side walls in said aligned pockets.

3. A coupling device according to claim 2 wherein said Belleville stack includes a plurality of dished washers having aligned openings, said thrust plates having openings aligned with said openings in said washers, said guide means pass through said dished washer openings and end portions on said guide means frictionally engaging said thrust plate openings.

4. A coupling device according to claim 3 wherein said guide means is a compressible spring pin.

5. A coupling device according to claim 3 wherein said guide means is a cylindrical pin.

6. A coupling device according to claim 5 wherein said plate openings are of a smaller diameter than said openings in said dished washers, said cylindrical pin has an intermediate portion cooperating said aligned openings in said dished washers and reduced diameter end portions frictionally engaging said openings in said thrust plates.

7. A coupling device according to claim 1 wherein said guide means is a pair of opposed telescoping cup-shaped housings enclosing said Belleville stack.

8. A coupling device according to claim 1 wherein said Belleville stack includes a plurality of dished washers stacked in series.

9. A coupling device according to claim 1 wherein said Belleville stack includes a plurality of dished washers stacked in parallel.

10. A coupling device according to claim 1 wherein said Belleville stack includes a plurality of dished washers stacked in parallel-series.

11. In a coupling device,
a rotatable hub having an integral radially extending flange,
a cover member secured to said flange,
a rotatable disc assembly positioned adjacent said cover member and having a lost motion connection with said flange,
a plurality of aligned pockets in said cover member and disc assembly having circumferentially spaced thrust receiving walls,
resilient means disposed in said aligned pockets,
said resilient means in said aligned pockets comprising a plurality of Belleville stacks,
a thrust plate engaging opposite ends of said Belleville stacks and adjacent thrust walls in said pockets, and
guide means engaging said thrust plates to retain said thrust plates and Belleville stacks in assembled relation within said aligned pockets.

12. A coupling device according to claim 11 wherein said lost motion connection includes a plurality of inwardly directed teeth on said disc assembly and outwardly directed teeth on said flange normally spaced from engagement with said disc assembly teeth.

* * * * *